United States Patent
Wu et al.

(10) Patent No.: US 11,379,903 B2
(45) Date of Patent: Jul. 5, 2022

(54) DATA PROCESSING METHOD, DEVICE AND STORAGE MEDIUM

(71) Applicant: BOE TECHNOLOGY GROUP CO., LTD., Beijing (CN)

(72) Inventors: Naifu Wu, Beijing (CN); Xitong Ma, Beijing (CN); Hongtao Guan, Beijing (CN)

(73) Assignee: BOE TECHNOLOGY GROUP CO., LTD., Beijing (CN)

( * ) Notice: Subject to any disclaimer, the term of this patent is extended or adjusted under 35 U.S.C. 154(b) by 498 days.

(21) Appl. No.: 16/243,759

(22) Filed: Jan. 9, 2019

(65) Prior Publication Data
US 2019/0370885 A1    Dec. 5, 2019

(30) Foreign Application Priority Data
May 31, 2018 (CN) .......................... 201810552823.3

(51) Int. Cl.
G06Q 30/00 (2012.01)
G06Q 30/06 (2012.01)
G06Q 20/12 (2012.01)
G06Q 20/40 (2012.01)

(52) U.S. Cl.
CPC ......... G06Q 30/0635 (2013.01); G06Q 20/12 (2013.01); G06Q 20/40145 (2013.01)

(58) Field of Classification Search
CPC ....................................... G06Q 30/0601–0645
USPC ................................................. 705/26.1–27
See application file for complete search history.

(56) References Cited

U.S. PATENT DOCUMENTS

| 9,911,290 | B1* | 3/2018 | Zalewski | ............ G06Q 20/327 |
| 2018/0260877 | A1* | 9/2018 | Li | ........................ G07G 1/0045 |
| 2019/0066169 | A1* | 2/2019 | Costello | .................. H04L 67/22 |

FOREIGN PATENT DOCUMENTS

| CN | 106203547 A | 12/2016 |
| CN | 107464116 A | 12/2017 |
| CN | 107563872 A | 1/2018 |
| CN | 107705129 A | 2/2018 |

OTHER PUBLICATIONS

Devin Coldewey, "Inside Amazon's surveillance powered no check-out convenience store". TechCrunch. Jan. 21, 2018 (Year: 2018).*
First Office Action for CN Patent Application No. 201810552823.3 dated Nov. 2, 2020.

* cited by examiner

*Primary Examiner* — Mila Airapetian
(74) *Attorney, Agent, or Firm* — Thomas | Horstemeyer LLP

(57) ABSTRACT

The present disclosure relates to a data processing method, device, and storage medium. The method includes obtaining information indicating that a plurality of users put one or more items into a container device. The information includes a device identification of the container device, user identifications of the plurality of users, item identifications of the one or more items, and action information indicating that the users put one or more items into the container device. The method includes determining a correspondence between the items and the users according to the information indicating that the plurality of users put one or more items into the container device.

11 Claims, 4 Drawing Sheets

---

Obtain information indicating that a plurality of users put one or more items into a container device   101

Determine a correspondence between the items and the users according to the information indicating that the plurality of users put one or more items into the container device   102

DATA PROCESSING METHOD, DEVICE AND STORAGE MEDIUM

CROSS REFERENCE

The present application is based upon and claims priority to Chinese Patent Application No. 201810552823.3, filed on May 31, 2018, and the entire contents thereof are incorporated herein by reference.

TECHNICAL FIELD

The present disclosure relates to data processing technologies, and in particular, to a data processing method and device and storage medium.

BACKGROUND

Unmanned supermarket is a supermarket that has emerged in recent years. In an unmanned supermarket, no cashier is required to perform checkout, and payments are automatically completed by systems.

When shopping in an unmanned supermarket, there are often scenes where many people share a shopping cart. For example, students and white-collar workers tend to shop together. When shopping in a traditional supermarket, the payment can be performed separately because there are humans for manual checkout in the supermarket. However, in an unmanned supermarket, for a group of people who are shopping together, each person uses a shopping cart for single user checkout. This will result in waste of resources, and does not meet the needs of individualized and user-friendly unmanned supermarkets. For example, if the maximum number of shopping carts in an unmanned supermarket does not meet the current total number of people in the supermarket, many customers need to wait in line until there is shopping cart available to perform checkout, which is inconvenient for users.

It should be noted that the information disclosed in the Background section above is only for enhancing the understanding of the background of the present disclosure, and thus may include information that does not constitute prior art known to those of ordinary skill in the art.

SUMMARY

Arrangements of the present disclosure provide a data processing method and device, and storage medium.

According to an aspect of the present disclosure, a data processing method is provided. The method includes obtaining information indicating that a plurality of users put one or more items into a container device. The information includes a device identification of the container device, user identifications for the plurality of different users, item identifications of the one or more items, and action information indicating that the users put one or more items into the container device. The method includes determining a correspondence between the one or more items and the plurality of users according to the information indicating that the plurality of users put one or more items into the container device.

According to another aspect of the present disclosure, a data processing device is provided. The device includes an obtaining module configured to obtain information indicating that a plurality of users put one or more items into a container device. The information includes a device identification of the container device, user identifications of the plurality of users, item identifications of the one or more items, and action information indicating that the users put one or more items into the container device. The device includes a determination module configured to determine a correspondence between the one or more items and the plurality of users according to the information indicating that the plurality of users put one or more items into the container device.

According to another aspect of the present disclosure, a payment processing device is provided. The device includes a processor, and a memory, storing program instructions executable by the processor. The processor is configured to perform the foregoing method.

According to another aspect of the present disclosure, a computer readable storage medium is provided for storing non-transitory computer readable instructions. When the non-transitory computer readable instructions are executed by a computer, the method as described is performed.

BRIEF DESCRIPTION OF THE DRAWINGS

The above and other features and advantages of the present disclosure will become more apparent from the detailed description by describing exemplary arrangements thereof in detail by referring to the drawings. It is apparent that the drawings in the following description show only some of the arrangements of the present disclosure, and other drawings may be obtained by those skilled in the art without departing from the drawings described herein. In the drawings.

DETAILED DESCRIPTION

Figure 1:
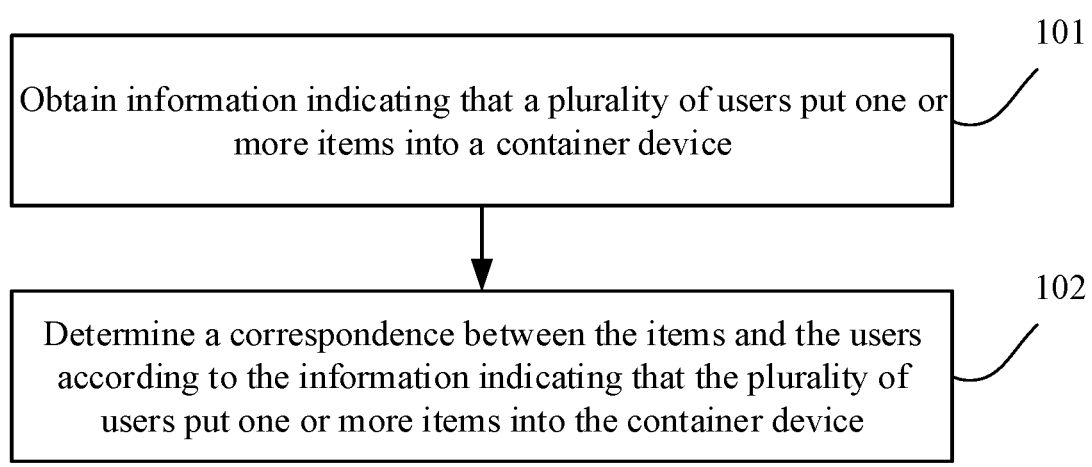
FIG. 1 shows a flow chart of a data processing method according to at least one exemplary arrangement of the present disclosure.

Example arrangements will now be described more fully with reference to the drawings. However, the example arrangements can be embodied in various forms and should not be construed as being limited to the examples set forth herein; rather, these arrangements are provided so that the present disclosure will be more comprehensive and complete, and the conception of the example arrangements will be fully conveyed to those skilled in the art. The described features, structures, or characteristics may be combined in any suitable manner in one or more arrangements. In the following description, numerous specific details are set forth to provide a full understanding of the arrangements of the present disclosure. However, one skilled in the art will appreciate that the technical solutions of the present disclosure can be practiced when one or more of the described specific details may be omitted or other methods, components, devices, steps, etc. may be employed.

In addition, the drawings are merely schematic representations of the present disclosure and are not necessarily drawn to scale. The same reference numerals in the drawings denote the same or similar parts, and the repeated description thereof will be omitted.

FIG. 1 shows a flow chart of a data processing method of at least one exemplary arrangement of the present disclosure. As shown in FIG. 1, the method includes the following blocks:

In block 101, information indicating that a plurality of users put one or more items into a container device (such as a shopping cart) is obtained. The information includes device identification of the container device, user identification for distinguishing different users, item identification for distinguishing different items, and action information indicating that the users put one or more items into the container device.

In block 102, a correspondence between the items and the users is determined according to the information indicating that the plurality of users put one or more items into the container device.

According to the technical solution provided by the arrangement of the present disclosure, information indicating that a plurality of users put one or more items into a container device is obtained. The information includes device identification of the container device, user identification for distinguishing different users, item identification for distinguishing different items, and action information indicating that the users put one or more items into the container device. A correspondence between the items and the users is determined according to the information indicating that the plurality of users put the item into the container device. In this way, even if a plurality of users share a shopping cart in a unmanned supermarket, each user can be separately charged based on the determined correspondence between the items and the users, thus realizing automatic payment processing when a plurality of users share a shopping cart. Moreover, since it is not needed for each user to use a shopping cart to perform checkout, resources are saved.

Implementations of the arrangements of the present disclosure will be described below in conjunction with specific examples.

In an arrangement of the present disclosure, a behavior capture device may be provided in a unmanned supermarket, and the behavior capture device may be a camera provided on a wall or shelf of the supermarket or a camera on a shopping cart for capturing behaviors of consumers. The camera may be used to determining if an item in the supermarket is taken by a consumer. The behavior capture device may also be other sensors capable of identifying user behaviors, which is not limited in the arrangements of the present disclosure.

For each item in the unmanned supermarket, each item is provided with its own corresponding item identification, such as an electronic tag. The item identification can be associated with information such as an introduction, price information and the like of the item. When a user in the supermarket puts an item into the shopping cart, the electronic tag of the item can be obtained through a camera on the shelf or on the wall or a camera on the shopping cart. Alternatively, the item identification such as an electronic tag on the item may be identified by other identification devices, for example, the electronic tag may be read by a near field device.

In an unmanned supermarket, for a one-cart-multi-person scenario (i.e., one shopping are shared by multiple customers), a sorting device may be provided to sort the items belonging to each user after the users complete the shopping. For example, items belonging to the same consumer can be put in a shopping bag for the consumer to take away.

In an unmanned supermarket, each shopping cart can also have device identification, so that different shopping carts can be distinguished.

In addition, users entering an unmanned supermarket can also be distinguished by different user feature information, such as biometric feature information of different users, including at least one of the facial feature information, gait feature information, sound feature information, or fingerprint feature information.

Figure 2:
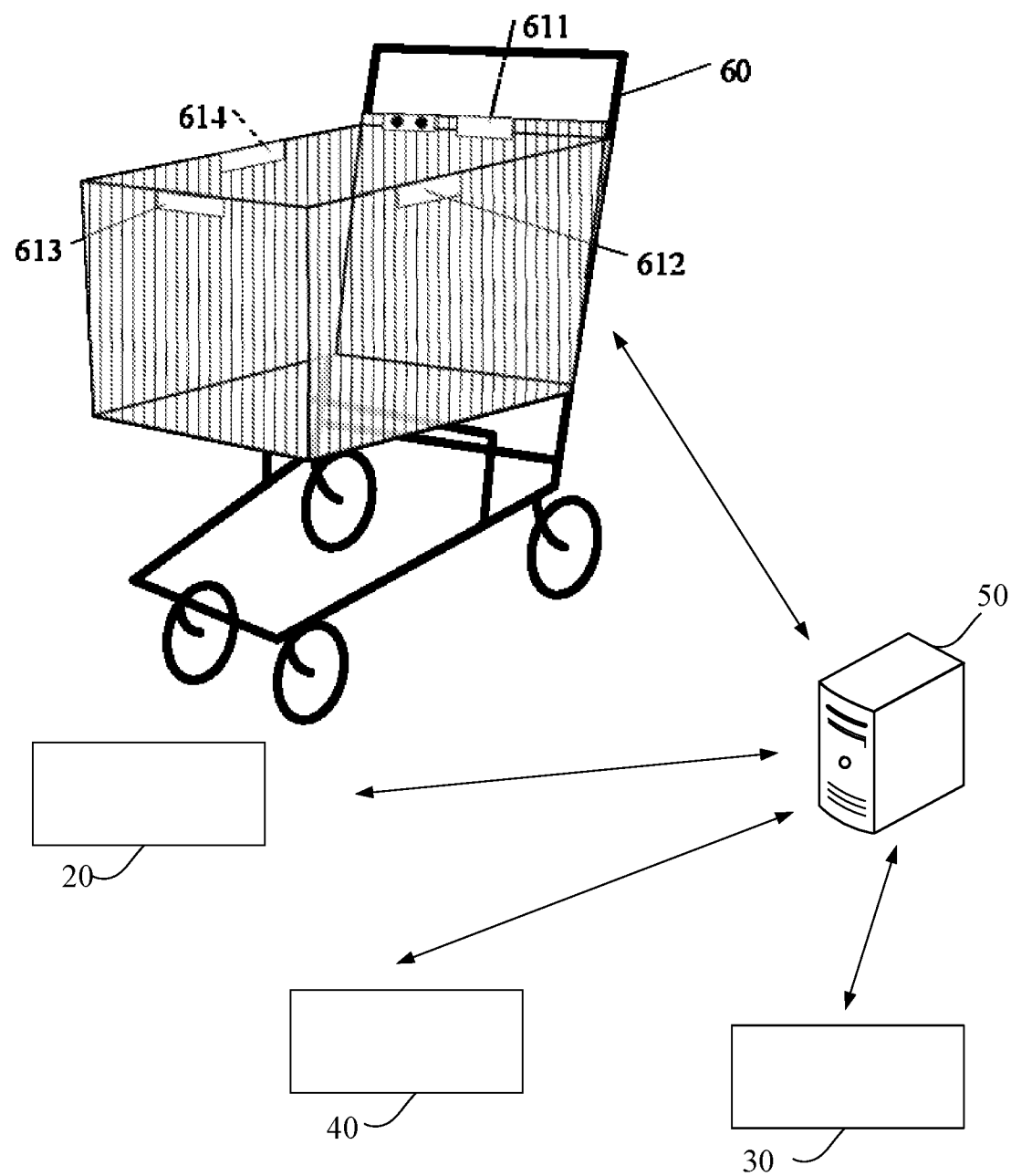
FIG. 2 shows a schematic diagram of an implementation environment of an unmanned supermarket involved in the arrangements of the present disclosure.

FIG. 2 shows a schematic diagram of an implementation environment of an unmanned supermarket involved in the arrangements of the present disclosure. As shown in FIG. 2, cameras 611, 612, 613, and 614 may be provided on the four side walls of a shopping cart 60. The cameras 611, 612, 613, and 614 may capture user behavior data, and may also capture the electronic tag of items that users take out from the shopping cart or puts into the shopping cart, and transmits the user behavior data and electronic tag to a server 50 (such as a cloud server). A camera 40 for facial recognition may be provided in the supermarket, which transmits the recognized facial data to the server 50. A smart sorting device 30 can also be provided in the supermarket for sorting items belonging to each user after the user completes the shopping (for example, before leaving the supermarket). Other devices 20 may also be provided in the supermarket, such as devices for sending prompt information to users (such as a loudspeaker or touch screen, etc.) or devices for receiving user instructions (such as a touch screen or an audio receiving device). The received user instructions can be transmitted to the server 50 which processes the received instructions.

Figure 3:
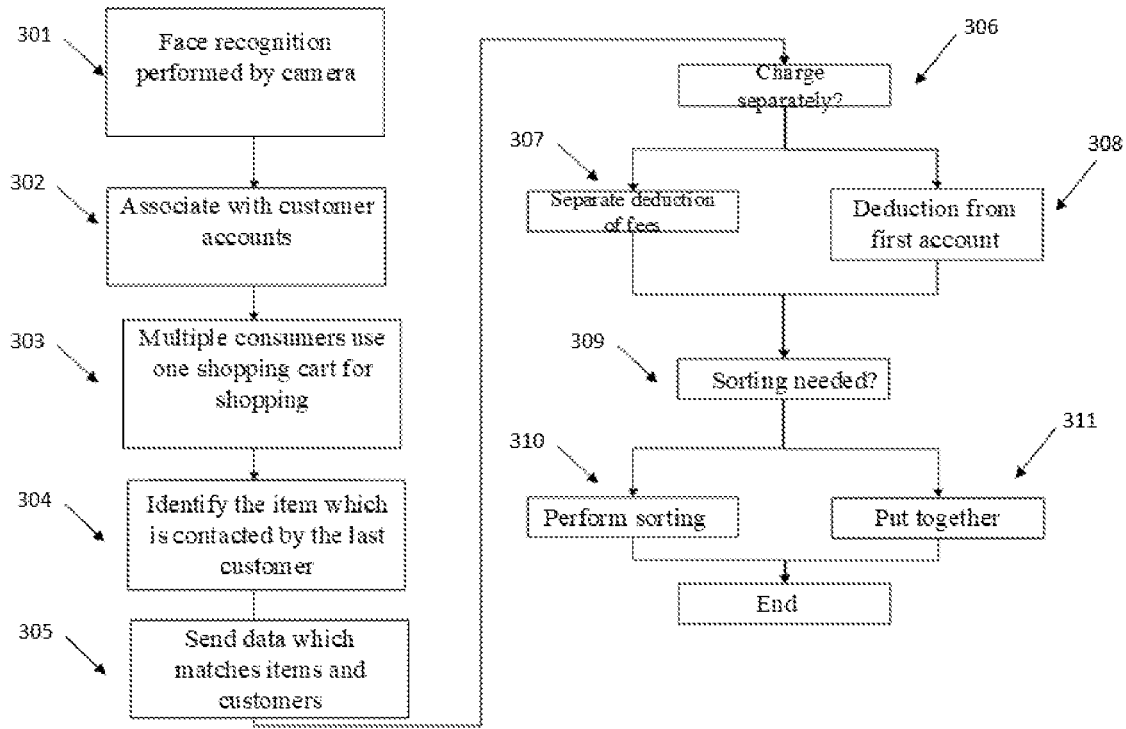
FIG. 3 shows a block diagram of one-cart-multi-account processing flow involved in the arrangements of the present disclosure.

FIG. 3 shows a block diagram of a one-cart-multi-account processing flow involved in the arrangements of the present disclosure.

First, the camera 40 in the supermarket can perform facial recognition before users (that is, the shoppers) enter the unmanned supermarket (operation 301). The identification information of each user and an account corresponding to each user are stored in the server 50, and the user identification corresponding to the facial recognition result can be found in the server 50 by the facial recognition result of the camera 40, and then the personal payment account associated with the user identification is found (operation 302).

Then, users take shopping carts and enter the supermarket to purchase goods. In the case where a plurality of users share one shopping cart, the cameras 611, 612, 613, 614 (i.e., behavior capture devices) on the shopping cart capture the user behaviors and transmit the captured information to the server 50 (operation 303). The information captured by the camera can be image information. Image information indicating that different users put one or more items into a container device may be obtained in block 101 of FIG. 1. For example, the image information indicating that different users put one items into a container device may be obtained by the camera provided on the shopping cart or the camera in the environment (such as the unmanned supermarket) where the shopping cart resides in.

According to at least one arrangement of the present disclosure, referring again to FIG. 1, block 101 may include obtaining image information indicating that a plurality of users put one or more items into a container device, and identifying, from the image information, the device identification of the container device, user feature information of different users and action information indicating that the users put one or more items into the container device. Block 101 may further include determining user identification of different users according to the user feature information.

Thereafter, the server 50 may determine the correspondence between each of the items and each of the users according to the action information indicating that the plurality of users put one or more items into the container device. For example, the association between a plurality of users and corresponding item information can be determined based on a last contact principle, which can include the following operations: for each item involved in the behavior data, identifying whether the item is put into the shopping cart after being contacted by the last user (operation 304); and if the item is put into the shopping cart after being contacted by the last user, determining that the item is an item to be purchased by the last user.

Specifically, the server 50 can determine whether an item is put into the shopping cart after being contacted by the last person, and if the item is put into the shopping cart, it can be determined that the person wishes to purchase the item. The server 50 can record the item information, the price and the user identification which matches the item information and the price (operation 305). That is, the server 50 can determine the association based on user identification-price-item information, which is used for checkout and sorting. For example, each time a user puts an item in the shopping cart, the server can determine the price of the item corresponding to the user and then generate a goods list corresponding to the user by the action information indicating that the user puts the item into the container device and the electronic tag information of the item.

According to at least one arrangement, the method may further include obtaining action information indicating that one or more items are taken out from the container device, and cancelling a correspondence between the one or more items being taken out and one or more corresponding users.

For example, if the behavior data captured by the camera indicates that a user puts an item back onto the shelf, that is, the item is taken out from the shopping cart, the server 50 can cancel the correspondence between the item being taken out and the user which correspondence was previously established, that is, the item is deleted from the corresponding shopping list.

After the users complete the shopping process, the users can go to the checkout lane to make a payment.

According to at least one arrangement, the data processing method may further include receiving a checkout request input by one or more of the users. The checkout request includes a checkout manner which includes an independent payment corresponding to each user or a combined payment corresponding to at least two users. The method may further include performing checkout according to the independent payment or the combined payment.

According to at least one arrangement, performing the checkout according to the independent payment includes generating payment lists for various goods, wherein each of the payment lists corresponds to one type of goods, and performing checkout separately according to different payment lists.

According to at least one arrangement, performing the checkout according to the combined payment includes generating a payment list for all the goods in the container device, and performing the checkout for all goods in the container device according to the payment list.

The other devices 20 in the unmanned supermarket can prompt the users whether to perform checkout separately by voice announcement, or can also prompt the users whether to perform checkout separately by options provided on a touch screen (operation 306). The user(s) can answer yes or no by voice, or can confirm yes or no by buttons on the touch screen. After receiving instructions from the user(s), if the instructions indicate that the user(s) wishes(wish) to pay separately (operation 307), the server 50 matches the information (i.e., the item information and price corresponding to each user identification), and then separately deducts the fee from the accounts corresponding to the users. If the instructions indicate that the user(s) wishes(wish) to pay together (operation 308), the users may be further prompted to confirm whether fees should be deducted from the first user account, and the user(s) may answer the question by voice, and the fees are deducted from the account confirmed by the user(s).

According to at least one exemplary arrangement of the present disclosure, after the fee deduction is completed, the method may further include the followings: receiving a sorting instruction is received; recognizing identification information of each item; determining a user corresponding to each item based on the identification information of each item; and putting each item into a storage device of the corresponding user.

Specifically, after the fees are deducted, the users can be prompted by voice announcement or touch screen to make the users confirm whether sorting is needed (operation 309). If an instruction indicating that the sorting is needed is received (operation 310), the server may send the matching information (i.e., the product information corresponding to each user, or the correspondence between the user identification and the products) to the sorting device, and the sorting device may identify the identification information of each item, and determine the user corresponding to each item by referring to the matching information sent by the server, and put each item in a storage device (such as a storage bag or a platform) of a corresponding user so that the user may take the storage device away. Otherwise, if an instruction indicating that the sorting is not need is received (operation 311), the server may put all the items together.

In the technical solutions provided by the arrangements of the present disclosure, by cameras and sensors provided in shopping carts and unmanned supermarkets, it is possible to realize a separate checkout function for a plurality of shoppers in a case where a plurality of shoppers share a shopping cart, and realize smart sorting. The technical solutions provided by arrangements of the present disclosure can adopt to actual consumer shopping experience and enable the unmanned supermarkets to have human-based management.

Figure 4:
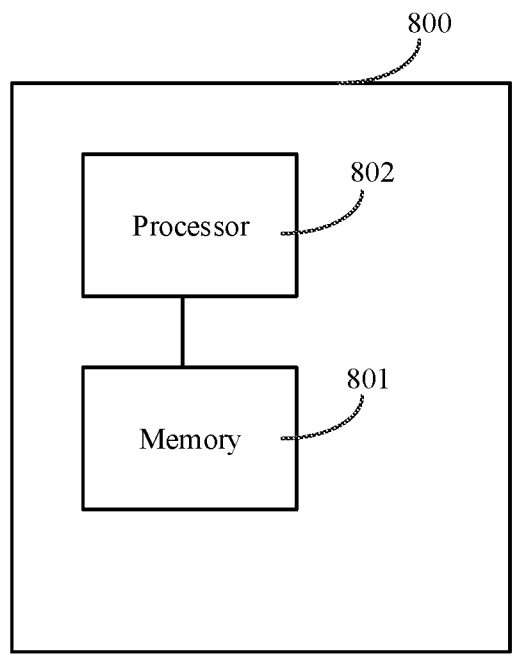
FIG. 4 shows a block diagram of a data processing device according to at least one arrangement of the present disclosure.

FIG. 4 shows a block diagram of a payment processing device according to at least one arrangement of the present disclosure. The device 800 can be provided in a server, and the device 800 can include a memory 801 and a processor 802. Computer program instructions which can be executed in the processor 802 are stored in the memory 801. The processor 802 executes a computer program to implement the methods described herein.

The memory 801 can be implemented by any type or a combination of volatile or non-volatile storage device, such as static random access memory (SRAM), electrically erasable programmable read only memory (EEPROM), erasable programmable read only memory (EPROM), programmable read only memory (PROM), read only memory (ROM), magnetic memory, flash memory, magnetic disk or optical disk.

The device 800 can be various devices with computing and processing capabilities, and can include various input devices (e.g., user interface, keyboard, etc.), various output devices (e.g., loudspeakers, etc.) and display devices in addition to the memory 801 and the processor 802, which will not repeat them herein.

An arrangement of the present disclosure further provides a computer readable storage medium storing computer programs, and when the computer programs are executed by the processor, the operations of the method provided by the arrangements of the present disclosure are implemented.

Figure 5:
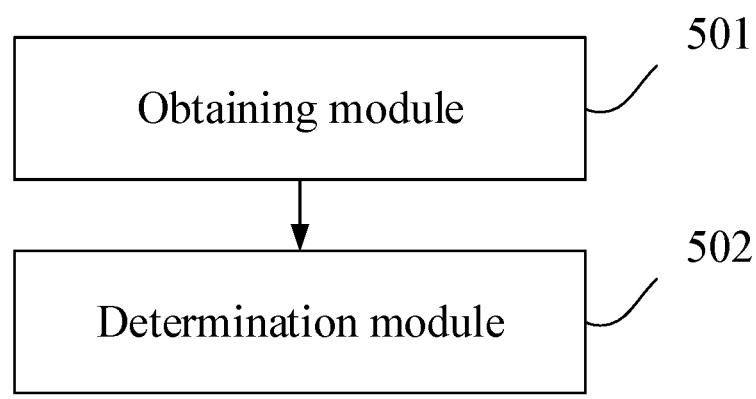
FIG. 5 shows a block diagram of a data processing device according to at least one arrangement of the present disclosure.

FIG. 5 shows a block diagram of a data processing device according to at least one arrangement of the present disclosure. The data processing device includes an obtaining module 501 and a determination module 502.

The obtaining module 501 is configured to obtain information indicating that a plurality of users put one or more items into a container device. The information includes device identification of the container device, user identification for distinguishing different users, item identification for distinguishing different items, and action information indicating that the users put one or more items into the container device.

The determining module 502 is configured to determine a correspondence between the items and the users according to the information indicating that the plurality of users put one or more items into the container device.

According to at least one exemplary arrangement, the obtaining module 501 is configured to:
obtain image information indicating that a plurality of users put one or more items into a container device, and identifying, from the image information, the device identification of the container device, user feature information of different users and action information indicating that the users put one or more items into the container device. The obtaining module 501 is configured to:
determine user identifications of different users according to the user feature information.

According to at least one arrangement, the determination module 502 is configured to determine the correspondence between each of the items and each of the users according to the action information indicating that the plurality of users put one or more items into the container device.

For example, the obtaining module 501 may be implemented by cameras such as the cameras 611, 612, 613, 614 shown in FIG. 2. The determination module 502 may be implemented by one or more processors, or may be implemented with software on one or more processors.

The principle of the data processing device for solving the technical problem is similar to the method arrangements, and thus the details thereof will not be repeatedly described herein.

It should be noted that although modules or units of devices for executing functions are described above, such division of modules or units is not mandatory. In fact, features and functions of two or more of the modules or units described above may be embodied in one module or unit in accordance with the arrangements of the present disclosure. Alternatively, the features and functions of one module or unit described above may be further divided into a plurality of modules or units.

In addition, although the various operations of the methods of the present disclosure are described in a particular order in the figures, it is not required or implied that the operations must be performed in the specific order, or all the operations shown must be performed to achieve the desired result. Additionally or alternatively, certain operations may be omitted, a plurality of operations may be combined into one operation, and/or one operation may be decomposed into a plurality of operations and so on.

Other arrangements of the present disclosure will be apparent to those skilled in the art. The present application is intended to cover any variations, uses, or adaptations of the present disclosure, which are in accordance with the general principles of the present disclosure and include common general knowledge or conventional technical means in the art that are not disclosed in the present disclosure. The specification and arrangements are illustrative, and the real scope of the present disclosure is defined by the appended claims.

What is claimed is:

1. A data processing method, comprising:
obtaining, by at least one hardware processor, information indicating that a plurality of users put one or more items into a container device using a camera, wherein the information comprises a device identification of the container device, user identifications for distinguishing the plurality of users, item identifications for distinguishing the one or more items, and first action information indicating that the plurality of users put the one or more items into the container device, wherein the items are goods and the container device is a shopping cart;
determining, by the at least one hardware processor, a correspondence between the one or more items and the plurality of users associated with the device identification of the container device according to the information indicating that the plurality of users put the one or more items into the container device;
receiving, by the at least one hardware processor, a checkout request associated with the device identification of the shopping cart, wherein the checkout request comprises a checkout manner, the checkout manner comprising an independent payment corresponding to each of the plurality of users associated with the device identification of the shopping cart, and the checkout request is triggered by a confirmation regarding whether independent payment is needed; and
in response to the checkout manner comprising the independent payment being received, generating, by the at least one hardware processor, multiple payment lists for different ones of the one or more users associated with the device identification of the shopping cart according to the correspondence and performing checkouts separately according to each of the payment lists;
wherein determining the correspondence between the one or more items and the plurality of users comprises, for each item involved in the first action information:
identifying whether the item is put into the shopping cart after being contacted by a last user; and
if the item is put into the shopping cart after being contacted by the last user, determining that the item is an item to be purchased by the last user; and
associating the item with the last user and the device identification of the shopping cart.

2. The data processing method according to claim 1, wherein obtaining information indicating that a plurality of users put one or more items into a container device comprises:
obtaining image information indicating that the plurality of users put the one or more items into the container device, and identifying, from the image information, the device identification of the container device, user feature information of different users of the plurality of users and the first action information indicating that the plurality of users put the one or more items into the container device; and determining the user identifications of the plurality of users according to the user feature information.

3. The data processing method according to claim 1, further comprising:
obtaining second action information indicating that one or more items are taken out from the container device; and
cancelling a correspondence between the one or more items being taken out and one or more corresponding users.

4. The data processing method according to claim 1, wherein obtaining image information indicating that a plurality of users put one or more items into a container device comprises: obtaining, by the at least one hardware processor, the image information indicating that the plurality of users put the one or more items into the container device by the camera, the camera being provided on the shopping cart or in an environment in which_the shopping cart resides.

5. The data processing method according to claim 2, wherein identifying user feature information of different users comprises: identifying respective biometric feature information of the plurality of users, wherein the biometric feature information comprises at least one of facial feature information, gait feature information, sound feature information or fingerprint feature information.

6. A data processing device, comprising:
an obtaining module configured to obtain information indicating that a plurality of users put one or more items into a container device, wherein the information comprises a device identification of the container device, user identifications of the plurality of users, item identifications of the one or more items, and first action information indicating that the users put the one or more items into the container device, wherein the items are goods and the container device is a shopping cart; and
a determination module configured to:
determine a correspondence between the one or more items and the plurality of users associated with the device identification of the container device according to the information indicating that the plurality of users put one or more items into the container device;
receive a checkout request, wherein the checkout request associated with the device identification of the shopping cart comprises a checkout manner which comprises an independent payment corresponding to each of the plurality of users associated with the device identification of the shopping cart, and the checkout request is triggered by a confirmation regarding whether independent payment is needed; and
in response to the checkout manner comprising the independent payment being received, generate multiple payment lists for different ones of the one or more users associated with the device identification of the shopping cart according to the correspondence, and perform checkout separately according to each of the payment lists, wherein determining the correspondence between the one or more items and the plurality of users, comprises, for each item involved in the first action information:
identifying whether the item is put into the shopping cart after being contacted by a last user; and
if the item is put into the shopping cart after being contacted by the last user, determining that the item is an item to be purchased by the last user; and associate the item with the last user and the device identification of the shopping cart.

7. The data processing device according to claim 6, wherein the obtaining module is configured to:
obtain image information indicating that the plurality of users the put one or more items into the container device, and identifying, from the image information, the device identification of the container device, user feature information of the plurality of users and the first action information indicating that the users put one or more items into the container device; and
determine the user identifications of the plurality of users according to the user feature information.

8. The data processing device according to claim 6, wherein:
the obtaining module is further configured to obtain second action information indicating that one or more items are taken out from the container device; and
the determination module is further configured to cancel a correspondence between the one or more items being taken out and one or more corresponding users.

9. A data processing device, comprising:
at least one hardware processor; and
program instructions stored in a memory and executable by the at least one hardware processor that, when executed, directs the at least one hardware processor to:
obtain information indicating that a plurality of users put one or more items into a container device, wherein the information comprises a device identification of the container device, user identifications of the plurality of users, item identifications of the one or more items, and first action information indicating that the users put the one or more items into the container device, wherein the items are goods and the container device is a shopping cart; and
determine a correspondence between the one or more items and the plurality of users associated with the device identification of the container device according to the information indicating that the plurality of users put the one or more items into the container device;
receive a checkout request, wherein the checkout request associated with the device identification of the shopping cart comprises a checkout manner which comprises an independent payment corresponding to each of the plurality of users associated with the device identification of the shopping cart, and the checkout request is triggered by a confirmation regarding whether independent payment is needed; and
in response to the checkout manner comprising the independent payment being received, generate multiple payment lists for different ones of the one or more users associated with the device identification of the shopping cart according to the correspondence, and perform checkout separately according to each of the payment lists, wherein determining the correspondence between the one or more items and the plurality of users, comprises, for each item involved in the first action information:
identifying whether the item is put into the shopping cart after being contacted by a last user; and
if the item is put into the shopping cart after being contacted by the last user, determining that the item is an item to be purchased by the last user; and associate the item with the last user and the device identification of the shopping cart.

10. The device according to claim 9, wherein the at least one hardware processor is further directed to:
- obtain image information indicating that the plurality of users put the one or more items into the container device;
- identify, from the image information, the device identification of the container device, user feature information of the plurality of users, and first action information indicating that the users put the one or more items into the container device; and
- determine user identifications of the plurality of users according to the user feature information.

11. The device according to claim 9, wherein the at least one hardware processor is further directed to:
- obtain second action information indicating that the one or more items are taken out from the container device; and
- cancel a correspondence between the one or more items being taken out and one or more corresponding users.

* * * * *